(12) United States Patent
Healy

(10) Patent No.: US 6,308,727 B1
(45) Date of Patent: Oct. 30, 2001

(54) FUEL DISPENSING SWIVEL BREAKAWAY ASSEMBLY

(75) Inventor: James W. Healy, Hollis, NH (US)

(73) Assignee: Healy Systems, Inc., Hudson, NH (US)

( * ) Notice: Subject to any disclaimer, the term of this patent is extended or adjusted under 35 U.S.C. 154(b) by 0 days.

(21) Appl. No.: 09/491,927

(22) Filed: Jan. 27, 2000

Related U.S. Application Data

(60) Provisional application No. 60/117,584, filed on Jan. 27, 1999.

(51) Int. Cl.$^7$ .............................. F16K 17/40; F16L 35/00
(52) U.S. Cl. ............................... 137/68.15; 285/2
(58) Field of Search ............................ 137/68.14, 68.15, 137/68.16, 614.04; 285/1, 2

(56) References Cited

U.S. PATENT DOCUMENTS

| | | | |
|---|---|---|---|
| 3,171,444 | 3/1965 | Fromm | 141/293 |
| 4,449,545 | 5/1984 | Vernor . | |
| 4,646,773 | 3/1987 | Klop et al. . | |
| 4,827,960 | 5/1989 | Nitzberg et al. | 137/68.15 |
| 4,905,733 | 3/1990 | Carow | 137/614.04 |
| 5,209,262 | 5/1993 | Carow et al. . | |
| 5,297,574 | 3/1994 | Healy | 137/68.1 |
| 5,433,247 | 7/1995 | Guertin . | |
| 5,570,719 | 11/1996 | Richards et al. . | |
| 5,695,221 | 12/1997 | Sunderhaus . | |

OTHER PUBLICATIONS

PCT International Search Report; PCT/US00/01932; John Rivell; Apr. 11, 2000.

*Primary Examiner*—John Rivell
(74) *Attorney, Agent, or Firm*—Fish & Richardson P.C.

(57) ABSTRACT

A coaxial hose, dual plane, swivel breakaway assembly for use in combination with a fuel dispenser apparatus is disposed between a hose attached to a fuel dispenser unit and a nozzle. The swivel breakaway assembly 30 has body portions with a first, assembled condition and a second condition in which the body portions are separated. A fuel valve located in the dispenser-end body portion permits flow of fuel when the body portions are assembled and resists flow upon separation. An element securing the body portions together releases engagement upon application of tension force above a predetermined maximum level to the hose and nozzle across the swivel breakaway assembly. In a preferred embodiment, the hose is coaxial, and a vapor valve is also disposed within the swivel breakaway assembly.

18 Claims, 3 Drawing Sheets

FUEL DISPENSING SWIVEL BREAKAWAY ASSEMBLY

This application claims the benefit of U.S. Provisional Patent Application No. 60/117,584, filed Jan. 27, 1999.

The invention relates to hoses for dispensing fuel and other flammable liquids.

BACKGROUND OF THE INVENTION

Fuel dispensers such as those used for filling vehicle tanks at gasoline stations include a hose extending from the dispenser and terminating in a fuel delivery nozzle. Not infrequently, inattentive vehicle operators have been known to drive their vehicles away from the refueling area without disengaging the fuel nozzle from the vehicle fillpipe, resulting in damage to the dispenser and/or the vehicle, and often resulting in spillage of fuel and escape of fuel vapors.

My prior patent, Healy U.S. Pat. No. 5,297,574, the entire disclosure of which is incorporated herein by reference, describes a coaxial breakaway assembly designed, preferably, to be installed between a short whip hose attached to the dispenser and a relatively long fuel dispensing hose terminating in a fuel dispensing nozzle.

SUMMARY OF THE INVENTION

According to one aspect of the invention, a swivel breakaway assembly for use in combination with a fuel dispenser apparatus has a breakaway body having a first body portion and a second body portion, the first body portion and the second body portion, in an assembled state, defining a first conduit for flow of fuel from a fuel dispenser hose in communication with the first body portion to a fuel dispensing nozzle in communication with the second body portion, and defining a second conduit for flow of vapor from the fuel dispensing nozzle to the fuel dispenser hose. The swivel breakaway assembly also has a fuel shut-off valve disposed in the first conduit, having a first, open position for flow of fuel when the first body portion and second body portion are in the assembled state and a second, closed position for resisting flow of fuel when the first body portion and the second body portion are in a separated state. The fuel shut-off valve is adapted to move from the first, open position to the second, closed position upon separation of the second body portion from the first body portion. The swivel breakaway assembly also has a vapor shut-off valve disposed in the second conduit, having a first, open position for flow of vapor when the first body portion and second body portion are in the assembled state and a second, closed position for resisting flow of vapor when the first body portion 32 and second body portion 34 are in the separated state. The vapor shut-off valve is adapted to move from the first, open position to the second, closed position upon separation of the second body portion from the first body portion. A securement assembly secures the first body portion and the second body portion in the assembled state, the securement assembly being responsive to a separation force of predetermined magnitude to permit separation of the second body portion from the first body portion.

Preferred embodiments of the invention may include one or more of the following additional features. The second body portion has a first swivel element and a second swivel element joined for rotation in a first plane, and the second swivel element is joined for rotation to the fuel dispensing nozzle in a second plane. The first and second planes intersect to provide a dual plane swivel. The first and second conduits are coaxial. The second conduit is within the first conduit. The separation force of predetermined magnitude permitting separation of the second body portion from the first body portion is generated by forces applied during vehicle drive-off. The separation force of predetermined magnitude is about 250 pounds. The securement assembly engages aligned apertures of the first and second body portions. The first body portion has multiple apertures alignable with an aperture of the second body for engagement of the securement assembly. The fuel shut-off valve is disposed in the first body portion, and spring biased toward the second, closed position. The fuel shutoff valve is urged open by engagement with a surface of the second body portion. During separation of the second body portion from the first body portion, the fuel shut-off valve is drawn toward the second, closed position, by engagement, e.g., interference engagement, with a surface of the second body portion. The vapor shut-off valve is disposed in the first body portion, and spring biased toward the second, closed position. The vapor shut-off valve is urged open by engagement with a surface of the second body portion.

According to another aspect of the invention, a method for connecting a fuel dispensing nozzle to a fuel dispenser hose in a dual plane, swiveling engagement employing a breakaway assembly having a first body portion connected to the fuel dispenser hose and a second body portion connected to the fuel dispensing nozzle, the first body portion joined to the second body portion by releasible engagement responsive to a separation force of predetermined magnitude, comprises the steps of joining the first and second body portions with a securement assembly disposed in a pair of aligned orifices comprising a first orifice defined by the first body portion and an orifice defined by the second body portion. After a drive-off incident in which a separation force of predetermined magnitude is applied to separate the second body portion from the first body portion, joining the first body portion to the second body portion with a replacement securement assembly disposed in a pair of aligned orifices comprising a second orifice defined by the first body portion and the orifice defined by the second body portion.

Preferred embodiments of the inventive method may include one or more of the following additional features. After the drive-off incident in which the separation force of predetermined magnitude is applied to separate the second body portion from the first body portion, the step of joining the first body portion to a second body portion with a replacement securement assembly includes joining the first body portion to a replacement second body portion, or the step of joining the first body portion to a second body portion with a replacement securement assembly includes rejoining the first body portion to the second body portion.

The invention thus provides a coaxial hose, dual plane, swivel breakaway assembly that prevents or reduces substantial damage to service station gasoline dispensing equipment in the event of a vehicle drive-off (whether accidental or with a purpose) while the hose nozzle is engaged in the vehicle fillpipe. Preferably, the swivel breakaway assembly is equipped with a shear pin which fails when the hose is under a tension force of, e.g., 250 pounds maximum. When shear pin failure occurs, the swivel breakaway assembly automatically seals the gasoline passage on the dispenser side of the assembly. The swivel breakaway assembly also provides for automatic sealing of the vapor passage on the dispenser side of the assembly, thus preventing the vapor vacuum pump from ingesting air into the ullage space of underground storage tanks with resultant release of vapor into the environment, or from releasing vapor directly into the environment when the vacuum pump is not in operation.

These and other features and advantages of the invention will be seen from the following description of a presently preferred embodiment, and from the claims.

BRIEF DESCRIPTION OF THE DRAWING

FIG. 3 is a side view of a multi-product fuel dispenser equipped with a coaxial hose, dual plane, swivel breakaway assembly of the invention, while

DESCRIPTION OF THE PREFERRED EMBODIMENTS

Figure 1:
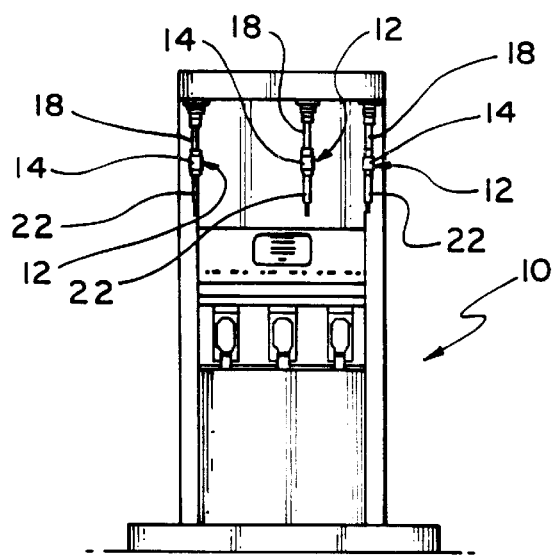
FIGS. 1 and 2 are front and side views, respectively, of a multi-product fuel dispenser equipped with a coaxial breakaway assembly of the prior art.
Figure 2:
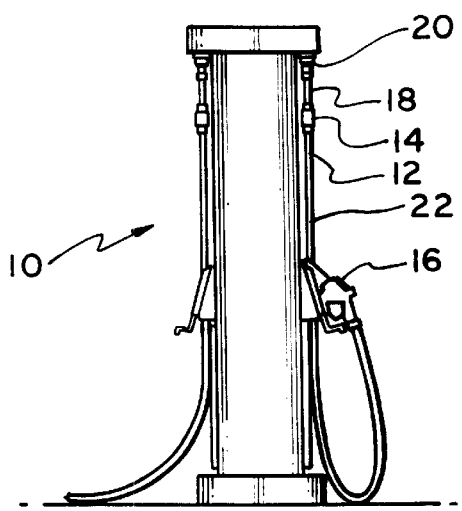

Referring to FIGS. 1 and 2, a multi-product fuel dispenser 10 of a type employed for dispensing fuel to vehicles at a gasoline station has a coaxial hose 12 equipped with a prior art breakaway assembly 14, e.g., as described in my earlier patent, Healy U.S. Pat. No. 5,297,574. The hose 12 terminates in a fuel dispensing nozzle 16 for delivery of fuel to the vehicle tank and vacuum removal of displaced vapor. The hose 12 includes a short segment 18 of coaxial hose connected between dispenser hose fitting 20 and a prior art breakaway assembly 14, and a longer segment 22 of coaxial hose connected between the breakaway assembly 14 and the nozzle 16. The short segment 18 of hose ensures that the breakaway assembly 14 will experience only axial tension forces when the longer segment 22 of the hose 12 is pulled taut by vehicle drive-off, whether by accident or with a purpose.

Figure 3:
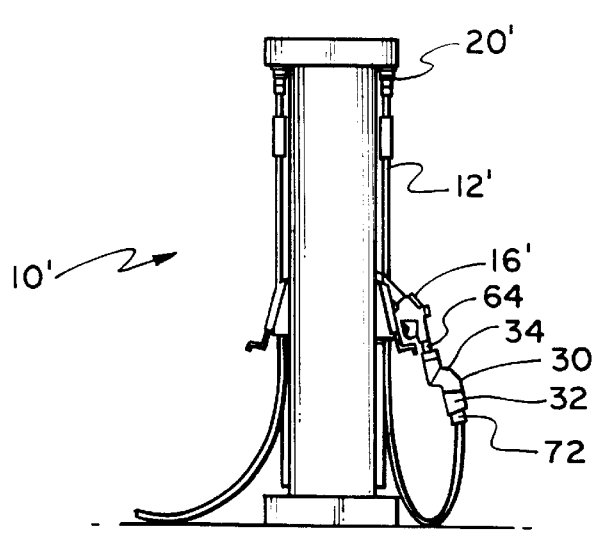
Figure 4:
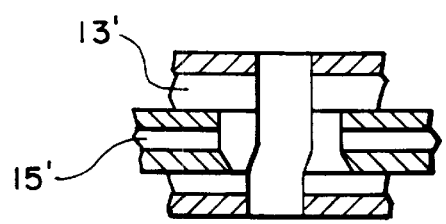
FIG. 4 is an enlarged, side view, partially in section, of the coaxial hose.

Referring now to FIG. 3, a multi-product fuel dispenser 10' of a type employed for dispensing fuel to vehicles at a gasoline station has a coaxial hose 12' terminating in a dual plane, swivel breakaway assembly 30 of the invention, to which, in turn, is connected a fuel dispensing nozzle 16' for delivery of fuel to the vehicle tank and vacuum removal of displaced vapor. Referring also to FIG. 4, the coaxial hose 12' defines a first outer passage 13 for delivery of fuel and a coaxial second inner passage 15 for vacuum return of vapor displaced from the vehicle fuel tank.

Figure 5:
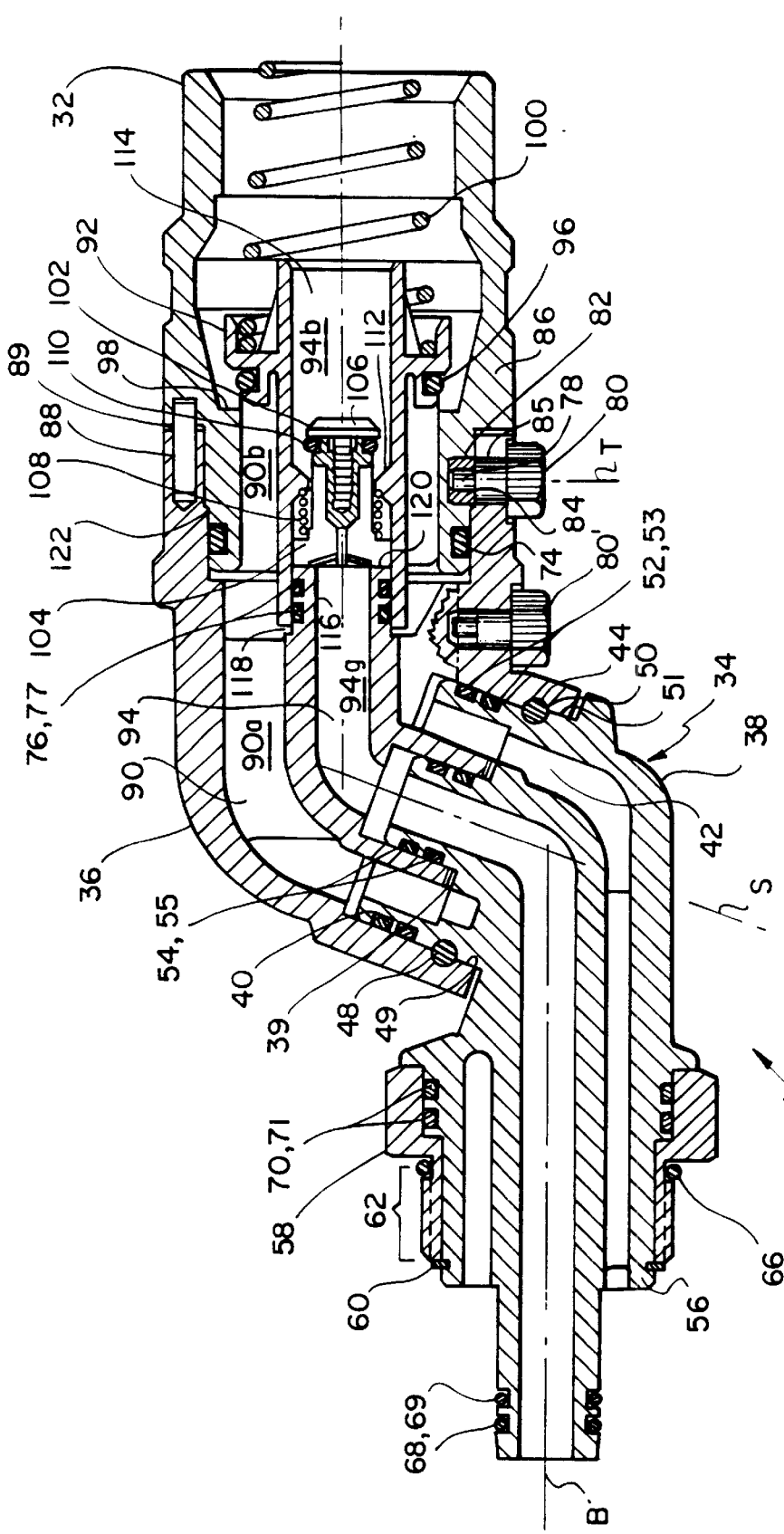
FIG. 5 is a side section view of the swivel breakaway assembly of FIG. 3.
Figure 6:
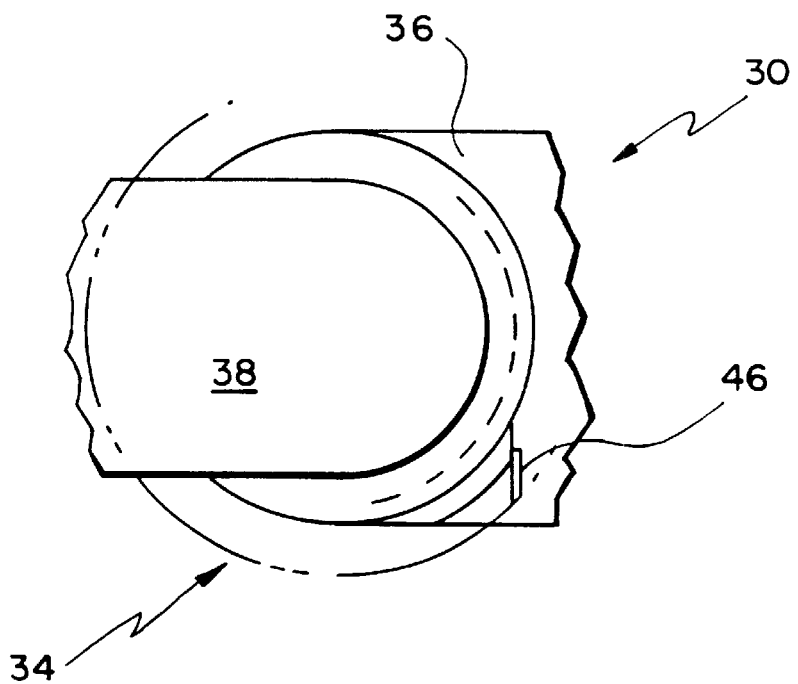
FIG. 6 is an end plan view of the swivel breakaway assembly taken at the line 6—6 of FIG. 5.

In FIG. 5, the swivel breakaway assembly 30 is shown in its normal (assembled) operating state. The swivel breakaway assembly 30 consists of two main body parts, namely, a dispenser-end body portion 32 and a swivel assembly 34, the swivel assembly consisting of a female swivel element 36 and a male swivel element 38. The female swivel element and male swivel element are assembled for rotation about axis, S (FIG. 5), by engagement of the inner end 40 of male swivel element 38 within socket 42 defined by the opposed inner end 44 of female swivel element 36, with a spring washer 39 disposed therebetween. The male and female swivel elements are secured together by nylon rod 44 disposed in opposed grooves 48, 50 defined by opposed surfaces 49, 51, respectively, of the female and male swivel elements, and sealed by pop rivet 46 (FIG. 6). The interfaces of the male swivel element and the female swivel element are sealed by o-ring pairs 52, 53 and 54, 55.

The free end 56 of male swivel element 38 is fitted with a rotatable bushing 58, secured by a retaining ring 60. The bushing defines a threaded surface 62 for engagement with the hose fitting 64 (FIG. 3) of nozzle 16', thus permitting relative rotation, about axis, B, between the nozzle 16' and the swivel breakaway assembly 30. The interface of the male swivel element 38 with the nozzle 16' is sealed by o-ring 66 and o-ring pair 68, 69. The interface of the bushing 58 with the male swivel element 38 is sealed by o-ring pair 70, 71.

Dispenser-end body 32 is threaded to hose fitting 72 (FIG. 3) of hose 12'. The interface of the dispenser-end body 32 and the swivel assembly 34 is sealed by o-ring 74 and by o-ring pair 76, 77, and the dispenser-end body and the swivel assembly are axially restrained from separation by extension pin 78 of shear screw 80 extending through hole 85 of swivel assembly 34 and into the shear bushing 82. The bushing 82 is, in turn, secured in cylindrical bore 84 in the side-wall 86 of the dispenser-end body portion 32. In preferred embodiments, the swivel breakaway assembly 30 is provided with four shear bushings 82 installed in the dispenser-end body portion 32. This provides spare receptacles (spaced at 90° increments in sidewall 86, only one is shown) for shear screws 80' for use when reattaching the dispenser-end body portion 32 to the swivel assembly 34, e.g., after a vehicle drive-off incident. Laboratory tests have shown that the remnant shear pins 78 will typically wedge in the shear bushing 80, due to the offset axis condition between the dispenser-end body portion 32 and the swivel assembly 34. Coaxial tension, e.g., as in the case of the prior art breakaway assembly of Healy U.S. Pat. No. 5,297,574, does not cause this shear pin remnant sticking problem. Four holes 89 are drilled into the dispenser-end body portion 32 and swivel assembly 34 to provide angular alignment reference for the dowel pin 88 when reassembly is required. The holes 89 are spaced at 90° increments in sidewall 86 (only one is shown).

In assembled state, the body parts 32, 34 together define a first, outer conduit 90 which connects the outer passage 13' of hose 12' (FIG. 4) to the nozzle 16' for passage of fuel through the swivel breakaway assembly. O-ring seal 74 (between the dispenser-end body portion 32 and the female swivel element 36), o-ring pair 52, 53 (between the female swivel element and the male swivel element 38), and o-ring pair 70, 71 (between the male swivel element 38 and the rotatable bushing 58) together provide sealing to prevent external leakage of fuel (gasoline) from the conduit 90. In particular, the swivel assembly 34 defines first outer conduit segment 90a and the dispenser-end body portion 32 defines second outer conduit segment 90b.

In the preferred embodiment, the dispenser-end body portion 32 further encloses a gasoline shutoff valve 92 and defines a second, inner conduit 94 connecting the inner passages 15' of hose 12' (FIG. 4) with the nozzle 16' for return passage of vapor fuel through the swivel breakaway assembly. In particular, the swivel assembly 34 defines first outer conduit segment 94a and the shutoff valve 92 defines second inner conduit segment 94b. Gasoline shut-off valve 92 is centrally-located within conduit 90 of the swivel breakaway assembly 30. Valve 92, located on the dispenser side of the swivel breakaway assembly, is mounted within dispenser-end body portion 32 for axial movement between a first position (FIG. 5) for allowing flow of fuel through the conduit 90 within the swivel breakaway assembly, and a second position (FIG. 7) when the body parts are disassembled, as described more fully below. In its second position, valve 92 is adapted to resist flow of fuel in passage 90, from the dispenser 10' through hose 12' to nozzle 16'. The valve 92 is equipped with an o-ring 96 disposed in the second position for sealing engagement against the opposed bore wall surface 98.

Figure 7:
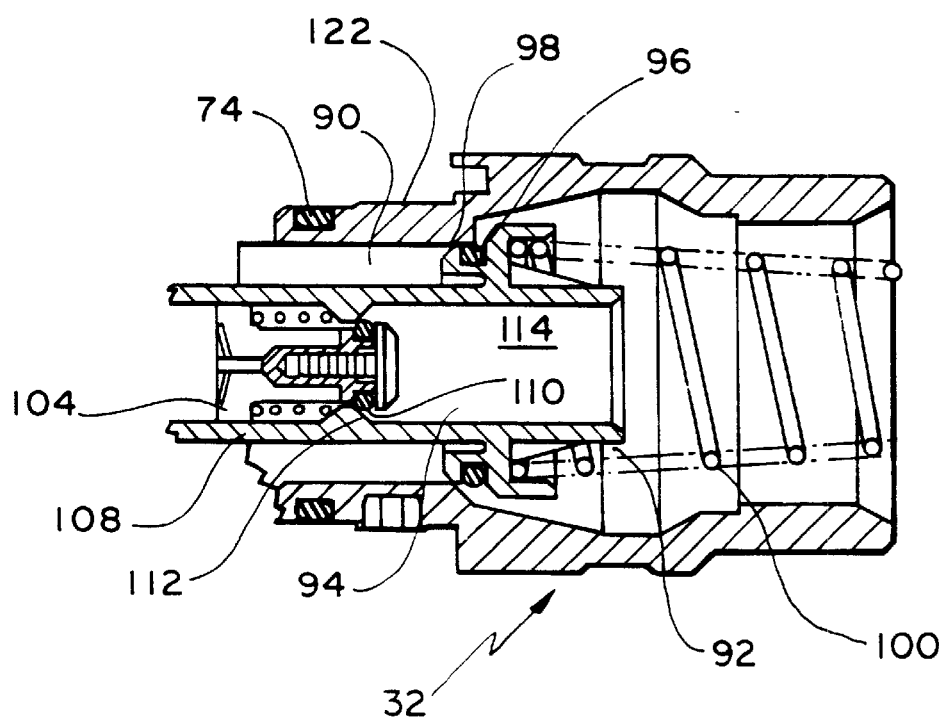
FIG. 7 is a side section view of a disassembled dispenser-end body portion of the swivel breakaway assembly of FIG. 3.

Referring to FIG. 7, when the dispenser-end body portion 32 and swivel assembly 34 are separated, e.g., in a vehicle drive-off incident, the gasoline shut-off valve 92 is urged toward its second position, sealing the gasoline passage 90, under the influence of conical spring 100 pressing against the nozzle inlet (not shown). However, when the body parts 32, 34 are assembled (as in FIG. 5), the bias of spring 100 is overcome, and the valve 92 is urged toward its first position, with the o-ring seal 96 spaced from the opposed wall surface 98, thus to permit flow of fuel.

A vapor valve 102, consisting of a valve body 104 and a barbed stud 106, is mounted within the swivel breakaway assembly 30 for axial movement in vapor passage 94 between a first position (FIG. 5) for allowing vacuum flow of vapor through the conduit 94 within the swivel breakaway assembly, and a second position (FIG. 7), when the body parts 32, 34 are disassembled, as described more fully below. In its second position, vapor valve 102 is adapted to seal the end of conduit segment 94b in a manner to prevent the vapor vacuum pump from ingesting air, or from releasing vapor when the vacuum pump is not in operation. The vapor valve 102 is urged toward its second, sealing position by compression spring 108, which, when the body parts 32, 34 are separated (FIG. 7), acts to force valve 102 to engage o-ring seal 110 in contact with valve seat surface 112 internal to gasoline shut-off valve 92. In the preferred embodiment, the compression spring 108 provides a predetermined force several times that required to hold the o-ring seal 110 in sealing engagement with seat 112 when the vacuum level in region 114 is 120 inches water column (WC).

Referring now again the FIG. 5, the dispenser-end body 32 and swivel 34 of the breakaway assembly 30 are brought together with axial force and rotationally positioned by engaging dowel pin 88, fixed to body 32, into receiving hole 84 in the opposed surface of female swivel 36. When the centerline, T, of the threaded hole 84 for receiving the shear pin extension 78 is aligned with the shear bushing 82, the shear screw 80 is installed. When the axial force is removed, the shear pin extension is the only restraint preventing separation of the swivel breakaway assembly body parts 32, 34.

In the assembled state (FIG. 5), the internal gasoline shut-off valve 92 is urged toward the first, open position (FIG. 5) by engagement of the valve 92 with the female swivel element 36, the gasoline shut-off valve 92 engaging over the wall 116 defining the inner (vapor return) passage 94a, the engagement being sealed by o-ring pair 76, 77 and limited by shoulder 118, which also urges the gasoline shut-off valve towards its first, open position. The vapor valve 102, is also urged toward its first, open position (FIG. 5) by engagement with the end surface 120 of wall 116. Thus, in assembled state, the gasoline shut-off valve 92 and vapor valve 102 mounted in dispenser-end body portion 32 are engaged by the female swivel element 36 in a manner to overcome the compression forces of spring 100 and spring 108 to position valves 92 and 102 in their respective first positions, thus to allow flow of fuel and vacuum flow of vapor through the swivel breakaway assembly 30.

Referring now to FIG. 7, when a predetermined tension force, e.g. 250 pounds maximum, is applied at the nozzle end of the hose 12', the shear screw pin extension 78 fails, allowing the body parts 32, 34 to separate. Conical spring 100 acts upon gasoline shut-off valve 92 to move the valve to its second, closed position, with o-ring seal 96 disposed in sealing engagement with bore wall surface 98, thus to prevent escape of fuel from hose segment 12' and dispenser 10', and spring 108 acts upon vapor valve 102 to move the valve to its second, closed position, with o-ring seal 110 disposed in sealing engagement with seat 112, thus to seal vapor passage 94.

O-ring seal pair 76, 77 (between the gasoline shut-off valve 92 and the wall of the female swivel element 36), o-ring seal pair 54, 55 (between the female swivel element 36 and male swivel element 38), and o-ring pair 68, 69 (between the male swivel element 38 and the nozzle 16') seal the gasoline passage 90 against leakage into the vapor passage 94. It is also desirable that the o-ring seal pair 76, 77, in interference fit between opposed surfaces of the gasoline shut-off valve 92 and the female swivel element 36, momentarily resists axial movement to separate the gasoline shut-off valve 92 from the female swivel element 36, thus to assist the compression spring 100 in moving the gasoline shut-off valve 92 towards its second, closed position during the first portion of swivel breakaway assembly separation with shear screw failure.

FIG. 7 shows the shear screw 80 after failure of the shear pin extension 78. This part is field-replaceable, thus permitting repeated use of the swivel breakaway assembly 30 as a safety device. The outer body design is such that the dispenser-end body portion 32 which mounts the shear screw 80 and dowel pin 88 is best suited to survive repeated impact with the driveway to the normal operating site. Dispenser-end body portion 32 with the exposed o-ring seal 74 and close-fitting external cylindrical surface 122 remain attached to the hose 12' coupled to the dispenser 10'.

The swivel breakaway assembly 30 of the invention takes advantage of the existing coaxial hose vapor tube adapter (not shown) to provide dynamic sealing when breakaway assembly separation occurs, and also to provide static sealing in both the normal operating state and the full separation condition.

Use of this type of nozzle-mounted, swivel breakaway assembly has an economic advantage over the hose-to-hose breakaway, e.g. as described in Healy U.S. Pat. No. 5,297, 574. Nozzle attachment avoids the need for two hose elements, thus saving approximately $50 per nozzle location. It also provides a more user-friendly nozzle-handling capability.

Also, in comparison with the axial breakaway assembly of Healy U.S. Pat. No. 5,297,574, the swivel breakaway assembly 30 of the invention eliminates a liquid shut off valve and spring, and the female swivel element 36 incorporates the shear screw 80, dowel pin 88, and o-ring 74. Eliminating one shut off valve allows significant size and weight reduction of the overall assembly. Absent this valve, the small amount of gasoline between the swivel assembly 34 and the nozzle liquid shut-off valve 92 might escape to the environment; however, this gasoline volume is less than the loss from a typical overfill or splashback incident in normal refueling operations. The improved nozzle handling characteristics, with the smaller, lighter weight swivel breakaway assembly 30, helps avoid nozzle handling mishaps, thus decreasing accidental liquid gasoline splash on the service station driveway. The improved handling will, in most instances, more than offset the amount of gasoline spilled by the relatively infrequent incident of breakaway separation from accidental drive-off.

Other embodiments are within the following claims.

What is claimed is:

1. A swivel breakaway assembly for use in combination with a fuel dispenser apparatus, said swivel breakaway assembly comprising:

a breakaway body having a first body portion and a second body portion, said first body portion and said second body portion, in an assembled state, defining a first conduit for flow of fuel from a fuel dispenser hose in communication with said first body portion to a fuel dispensing nozzle in communication with said second body portion, and defining a second conduit for flow of vapor from the fuel dispensing nozzle to the fuel dispenser hose, a fuel shut-off valve disposed in said first conduit and having a first, open position for flow of fuel when the first body portion and second body portion are in the assembled state and a second, closed position for resisting flow of fuel when the first body portion and second body portion are in a separated state, the fuel shut-off valve adapted to move from the first, open position to the second, closed position upon separation of the second body portion from the first body portion, a vapor shut-off valve disposed in said second conduit and having a first, open position for flow of vapor when the first body portion and second body portion are in the assembled state and a second, closed position for resisting flow of vapor when the first body portion and second body portion are in the separated state, the vapor shut-off valve adapted to move from the first, open position to the second, closed position upon separation of the second body portion from the first body portion, and a securement assembly securing the first body portion and the second body portion in the assembled state, said securement assembly responsive to a separation force of predetermined magnitude to permit separation of said second body portion from said first body portion, said securement assembly comprising a unitary shear member disposed in a pair of radially aligned orifices of the first body portion and the second body portion, the first body portion defining a plurality of radial orifices for use serially with a singular radial orifice of the second body portion.

2. The swivel breakaway assembly of claim 1, wherein said second body portion comprises a first swivel element and a second swivel element joined for rotation in a first plane, said second swivel element joined for rotation to the fuel dispensing nozzle in a second plane disposed at an angle to the first plane.

3. The swivel breakaway assembly of claim 2, wherein said first plane and said second plane intersect, thereby to provide a dual plane swivel arrangement.

4. The swivel breakaway assembly of claim 1, wherein said first conduit and said second conduit are coaxial.

5. The swivel breakaway assembly of claim 4, wherein said second conduit is within said first conduit.

6. The swivel breakaway assembly of claim 1, wherein said separation force of predetermined magnitude permitting separation of said second body portion from said first body portion is generated by forces applied during vehicle drive-off.

7. The swivel breakaway assembly of claim 1, wherein said separation force of predetermined magnitude is about 250 pounds.

8. The swivel breakaway assembly of claim 1, wherein said fuel shut-off valve is disposed in said first body portion.

9. The swivel breakaway assembly of claim 1, wherein said fuel shut-off valve is spring biased toward its second, closed position.

10. The swivel breakaway assembly of claim 1, wherein said fuel shutoff valve is urged open by engagement with a surface of said second body portion.

11. The swivel breakaway assembly of claim 1, wherein, during separation of said second body portion from said first body portion, said fuel shut-off valve is drawn toward its second, closed position, by engagement with a further surface of said second body portion.

12. The swivel breakaway assembly of claim 1, wherein, said fuel shut-off valve is drawn toward its second, closed position by interference engagement with said further surface of said second body portion.

13. The swivel breakaway assembly of claim 1, wherein said vapor shut-off valve is disposed in said first body portion.

14. The swivel breakaway assembly of claim 1, wherein said vapor shut-off valve is spring biased toward its second, closed position.

15. The swivel breakaway assembly of claim 1, wherein said vapor shut-off valve is urged open by engagement with a surface of said second body portion.

16. A method for connecting a fuel dispensing nozzle to a fuel dispenser hose in a dual plane, swiveling engagement employing a breakaway assembly having a first body portion connected to the fuel dispenser hose and a second body portion connected to the fuel dispensing nozzle, the first body portion joined to the second body portion by releasable engagement responsive to a separation force of predetermined magnitude, said method comprising joining the first body portion and the second body portion with a securement assembly comprising a unitary shear member disposed in a pair of radially aligned orifices comprising one radial orifice of a series of radial orifices defined by the first body portion and a radial orifice defined by the second body portion, and after a drive-off incident in which a separation force of predetermined magnitude is applied to separate the second body portion from the first body portion, joining the first body portion to a second body portion with a replacement unitary shear member disposed in a pair of radially aligned orifices comprising another orifice of the series of radial orifices defined by the first body portion and the radial orifice defined by the second body portion.

17. The method for connecting a fuel dispensing nozzle to a fuel dispenser hose of claim 16, wherein, after the drive-off incident in which the separation force of predetermined magnitude is applied to separate the second body portion from the first body portion, the step of joining the first body portion to a second body portion with the replacement unitary shear member includes joining the first body portion to a replacement second body portion.

18. The method for connecting a fuel dispensing nozzle to a fuel dispenser hose of claim 16, wherein, after the drive-off incident in which the separation force of predetermined magnitude is applied to separate the second body portion from the first body portion, the step of joining the first body portion to a second body portion with the replacement unitary shear member includes re-joining the first body portion to the second body portion.

* * * * *

UNITED STATES PATENT AND TRADEMARK OFFICE
CERTIFICATE OF CORRECTION

PATENT NO. : 6,308,727 B1
DATED : October 30, 2001
INVENTOR(S) : James W. Healy

It is certified that error appears in the above-identified patent and that said Letters Patent is hereby corrected as shown below:

Column 3,
Line 17, delete "taken at the line 6-6 of FIG. 5".

Column 5,
Line 37, delete "Body 32" and substitute -- female swivel 36 --.
Line 38, delete "female swivel 36" and substitute -- body 32 --.
Line 50, delete "94a" and substitute -- 94g --.

Column 6,
Line 21, delete "80".
Line 22, delete "78".

Signed and Sealed this

Thirteenth Day of August, 2002

Attest:

JAMES E. ROGAN
Attesting Officer      Director of the United States Patent and Trademark Office